April 17, 1951 M. E. MOHR 2,549,505

PHASE OR FREQUENCY MODULATION SYSTEM

Filed Sept. 9, 1948 4 Sheets-Sheet 1

INVENTOR
M. E. MOHR
BY Earl C. Laughlin
ATTORNEY

April 17, 1951 M. E. MOHR 2,549,505

PHASE OR FREQUENCY MODULATION SYSTEM

Filed Sept. 9, 1948 4 Sheets-Sheet 2

INVENTOR
M.E. MOHR
BY
Earl C. Laughlin
ATTORNEY

April 17, 1951 M. E. MOHR 2,549,505

PHASE OR FREQUENCY MODULATION SYSTEM

Filed Sept. 9, 1948 4 Sheets-Sheet 3

INVENTOR
M. E. MOHR
BY
Earl C. Laughlin
ATTORNEY

April 17, 1951

M. E. MOHR 2,549,505

PHASE OR FREQUENCY MODULATION SYSTEM

Filed Sept. 9, 1948

4 Sheets-Sheet 4

INVENTOR
M. E. MOHR
BY Earl C. Laughlin
ATTORNEY

Patented Apr. 17, 1951

2,549,505

UNITED STATES PATENT OFFICE 2,549,505

PHASE OR FREQUENCY MODULATION SYSTEM

Milton E. Mohr, New Providence, N. J., assignor to Bell Telephone Laboratories, Incorporated, New York, N. Y., a corporation of New York Application September 9, 1948, Serial No. 48,493

18 Claims. (Cl. 250—20)

The present invention relates to the use of a frequency dividing circuit, and specifically, of a multivibrator circuit, to obtain phase or frequency modulation of a carrier wave.

It is an object of the invention to secure precise and definite increments of phase or frequency modulation of a carrier wave under control of an input modulating or signal current through the agency of a frequency dividing circuit. These increments can be reduced in the final output wave by effecting the modulation at a high frequency and using successive frequency dividing stages to reduce the frequency to the final carrier frequency level.

While the step-wise character of the modulation process results in a certain amount of granularity in the output wave, the method has advantages which outweigh this disadvantage for certain types of signal, these advantages including an extremely high degree of frequency stability and high precision of phase or frequency control.

The general method of effecting phase or frequency control to be disclosed herein according to the invention, is by injecting into a frequency dividing circuit pulses slightly ahead of the regular driving pulses, under control of the input signal or control current. Each pulse so injected causes the multivibrator to reverse prematurely by a definite time and so advance the phase of the output wave. Only advances of phase are made by this method, there being no retardations of phase.

In one form of the invention to be disclosed herein pulses are used to produce phase modulation of a wave by causing a definite and fixed phase advancement for each input pulse. In another form of the invention to be disclosed pulses occurring at a rate which is a function of varying signal amplitude are supplied to the modulator, giving phase advances at different rates and therefore producing frequency modulation of a carrier wave.

Highly stable multivibrators can be used by this process and the frequency of the final output wave is, therefore, definitely tied to the high frequency input which may be a standard frequency.

While not limited thereto, the invention has special application to cases where the frequency modulated carrier wave to be transmitted is of low frequency, such as frequencies comparable to voice frequencies, for example, since it is feasible to carry out the frequency modulating steps at a frequency hundreds of times higher, at least, than the lower order mentioned and so reduce the granularity to a very small amount. In some cases, however, the granularity is not only not objectionable but is definitely desired, as will be described.

The various features and objects of the invention will be more fully brought out in the following detailed description in connection with the accompanying drawing in which.

Figure 1:
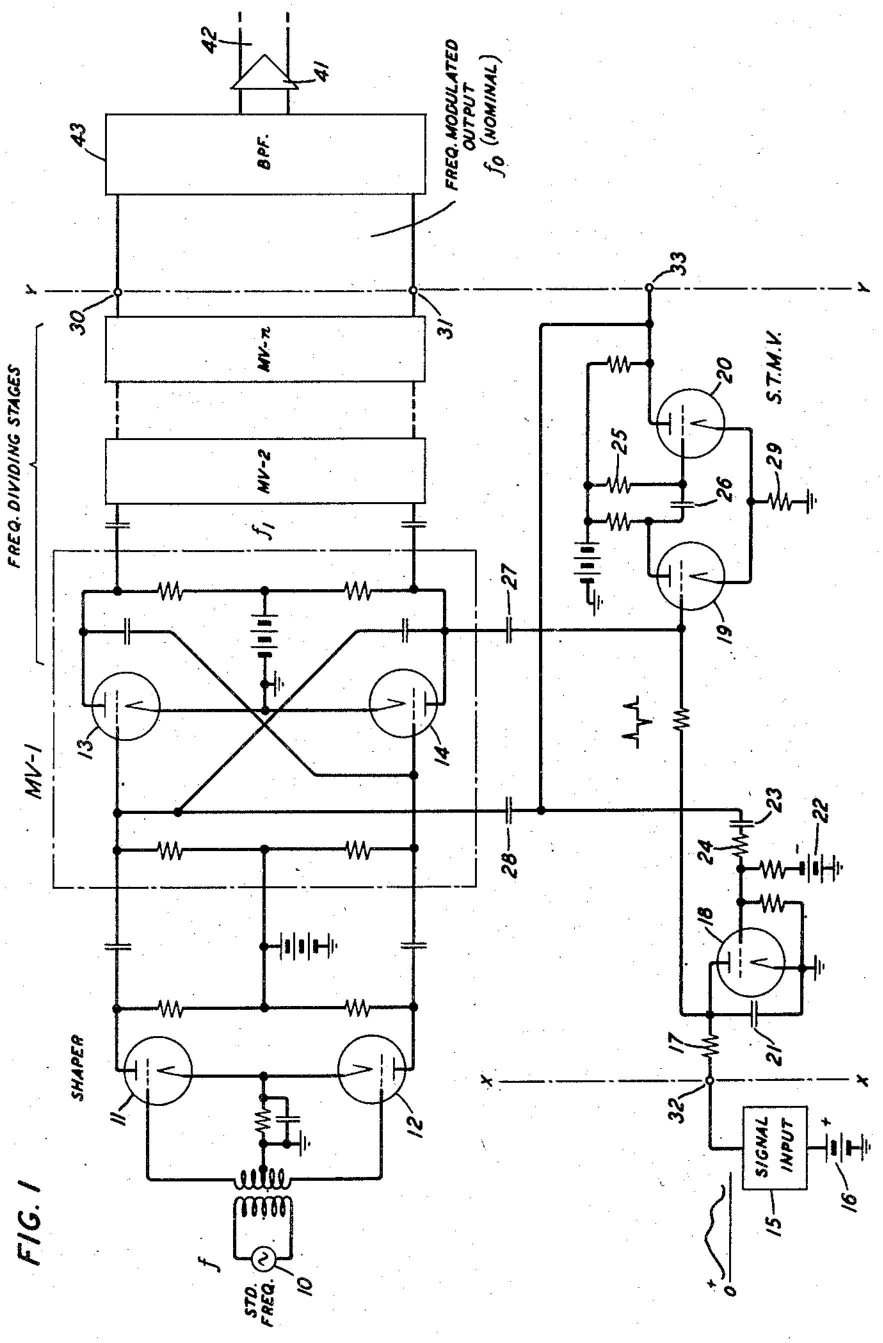
Fig. 1 is a schematic circuit diagram of a modulating or transmitting circuit using frequency modulation in accordance with one form of the invention.

Referring to Fig. 1, the oscillator 10 may be a crystal controlled oscillator or other wave source of highly stable frequency, $f$. Tubes 11 and 12 together form a wave shaping circuit for producing squared output waves suitable to drive multivibrators. Following tubes 11 and 12 is a series of frequency stepdown multivibrator stages MV—1 to MV—$n$ of the required number to accomplish the frequency reduction from $f$ to $f_0$ to suit given requirements. These multivibrators may be of known circuit configuration and they operate in known manner so far as their frequency reducing function is concerned.

The first of these multivibrator stages is, however, according to this invention, so controlled as to produce phase shifts in the output wave $f_0$ under control of an input signal and thus to produce frequency modulation of the output wave. This is accomplished by causing the reversal time of the multivibrator MV—1 to be shortened by a definite amount at times primarily determined by the signal. The control circuits for carrying out this action comprise the tubes 18, 19 and 20 and their associated circuit elements.

The signal 15, if it consists of both negative and positive voltage components, is connected in series with a positive battery 16 of such voltage as always to equal or exceed the negative signal portions and so make the signal of positive polarity only. For a positive polarity signal, battery 16 may be omitted. The condenser 21 is charged by the signal in series with resistor 17.

Tube 18 is for the purpose of discharging condenser 21 at times determined by the positive pulses sent to the grid of tube 18 from the plate of tube 20 of the single trip multivibrator 19—20. The operation of the 19—20 multivibrator will be shown to occur whenever the voltage on condenser 21 reaches a critical potential $e$, which depends upon the design of the 19—20 multivibrator, and when at the same time a positive pulse is obtained from the plate of tube 14 of the stepdown multivibrator MV—1. The length of the positive pulse applied to the grid of tube 18 is only long enough to assure suitable discharge of condenser 21 and this time is controlled by the time constant of resistance 24 and condenser 23 in the grid circuit of tube 18. The grid voltage is thus only momentarily driven positive each time the single trip multivibrator 19—20 operates. The rate at which the single trip circuit 19—20 operates depends primarily upon the rate of increase of voltage across condenser 21, which in turn depends upon the signal input voltage. Thus tube 19, normally cut-off due to plate current of tube 20 flowing in resistance 29, will not conduct until the positive spikes appearing on the grid of tube 19 from the plate of tube 14 plus the signal voltage across condenser 21 exceeds the cut-off voltage applied to tube 19. Thus the larger the signal voltage the greater the frequency with which the single trip circuit 19—20 operates. It is important to note here also that the multivibrator 19—20 operates only at a given time in the cycle of the multivibrator MV—1, namely at the time the plate of tube 14 changes positively at the instant tube 14 is cut off.

Figure 2:
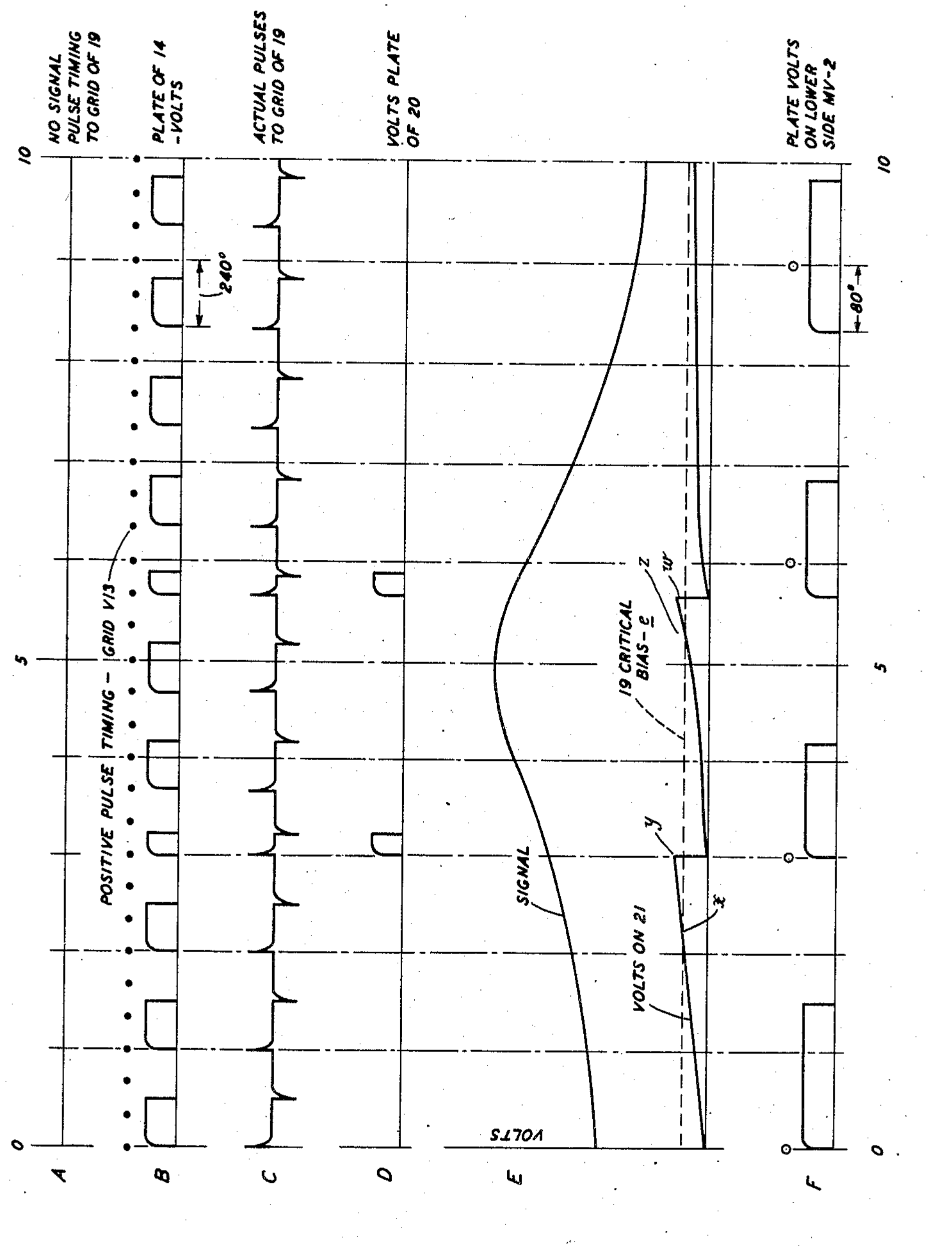
Fig. 2 shows graphs to be referred to in the description of Fig 1.

Fig. 2 illustrates in a qualitative manner the action of the resistor condenser circuit 17—21 and the associated circuits in deriving samples from the applied signal and in effecting the desired advances in phase to accompany each sample. Graph A of Fig. 2 shows the timing of the positive pulses derived from the plate of tube 14 on the assumption that the signal input at 32 is zero, and these times will be used for reference purposes. The diagrams are shown, for illustration, for the case of a three-to-one nominal stepdown multivibrator. The positive pulse timing on the grid of tube 13 derived from the plate of tube 11 is shown by the marks in graph B. The first three intervals of graph B show normal no-signal operation of tube 14. The circuit design of the multivibrator MV—1 is such that a reversal will occur every half of one of the time intervals shown in graph A but must coincide with the timing of the pulses indicated by the marks of graph B. That is, tube 14 can cut-off (its plate can go positive) only at a time corresponding to one of the B marks.

Graph E of Fig. 2 shows an illustrative signal voltage and the voltage appearing on condenser 21. The variations of the latter are coordinated with the action of the single trip multivibrator 19—20 and the stepdown multivibrator 13—14 as illustrated in graphs B, C and D. Tube 20 of Fig. 1 is normally at plate current saturation due to the plate battery applied to the grid through resistance 25. Tube 19 is normally at cut-off due to the biasing voltage applied by the flow of plate current from tube 20 through resistance 29. The grid of tube 19 is supplied with pulses by the coupling through small condenser 27 to the plate of tube 14 as shown by graph C but the design is such that these pulses will not cause 19 to conduct in the absence of a voltage of at least $e$ across condenser 21.

Referring to graph E, Fig. 2, the voltage rise on condenser 21 crosses the critical voltage at point X about time 2¼ (in terms of graph A) but tube 19 will not conduct until a positive pulse, as shown in graph C, is also present. Thus at time 3, shown as point Y, tube 19 conducts and through condenser 26 cuts off tube 20. This well known action occurs very quickly and the time for which the circuit 19—20 remains in this state depends upon the condenser-resistance time constant of elements 25, 26. This timing is adjusted to allow multivibrator 19—20 to return to normal in this illustrative case in slightly more than ⅙ of an interval as shown. The voltage wave shape at the plate of tube 20 is shown in graph D of Fig. 2. Now when the plate of 20 proceeds positively the grid of tube 18 is driven positive and tube 18 conducts in its plate circuit thereby discharging condenser 21. A positive pulse is also placed on the grid of 13 through condenser 28 but since tube 13 is already at plate saturation no change in multivibrator 13—14 is effected. At the time when circuit 19—20 restores to normal, however, about ⅙ of a period later, a large negative pulse is fed to the grid of tube 13 and the multivibrator 13—14 reverses prematurely as shown by graph B. As shown in this graph the multivibrator 13—14 now synchronizes with pulses ⅓ of a cycle earlier than before and an advance in phase, in this illustrative case of 120 degrees has been effected. The voltage on condenser 21 immediately starts to build up after tube 18 again cuts off and reaches the critical voltage $e$ at time $z$ but as before a delay until time $w$ when a positive pulse from tube 14 as available is encountered. Thus another 120-degree phase advance of the multivibrator 13—14 has been effected. The operation of the lower tube of the following multivibrator MV—2 is illustrated in graph F, Fig. 2. The times at which the voltage at this point would go positive in the absence of signal is shown by the small circles. The total phase advance of multivibrator MV—2 for the signal shown is thus 80 degrees while the total advance of multivibrator 13—14 is 240 degrees.

An examination of graph E shows that the signal is effectively sampled at times and the length of time between samples varies inversely as the signal amplitude. Each time a sample occurs the output frequency is shifted by a definite number of degrees. Thus, if the signal stays at a constant value these phase shifts continue to occur at a constant rate and the result is a change of frequency. This gives an output frequency change proportional to the signal while the nominal frequency remains tied to the standard source 10 in an intimate way.

Each of the signal samples derived in the manner just described, and illustrated in Fig. 2, causes an advance in the reversal time of multivibrator MV—1 by a definite amount which in turn advances the phase of the submultiple waves up to and including the output wave $f_0$, by a decreasing absolute amount in proportion to the reduction in frequency. This action is carried out through the agency of single trip multivibrator 19—20.

The advance in time made by a signal pulse in Fig. 2 may be equal to the time between two successive driving pulses of the same sign from source 10. If the natural period of MV—1, from one to the next cut-off time of the same tube (e. g., tube 13) is made about equal to that required for $2(n+1)$ driving pulses of the same polarity then the $2n^{th}$ such pulse normally causes the reversal. If there is a signal modulation, however, one of the reversals is advanced in time by the pulse from multivibrator 19—20 and the next normal reversal will then be caused by the driving pulse of given polarity immediately ahead of that pulse of the same polarity which would have caused the reversal in the absence of a signal modulation. This is indicated in at least a qualitative manner in Fig. 2.

In practice there might be other times intervening between the times shown in Fig. 2 at Y and W at which a modulating pulse could be supplied to the multivibrator MV—1 and the times illustrated are not to be considered representing all instants at which phase shifts might be introduced since the pulse frequency of wave $f_1$ will ordinarily be much higher in relation to the signal than as represented by Fig. 2, to allow for a large or considerable frequency reduction and still have the frequency of wave $f_0$ high relative to the highest essential signal frequency. If, for illustration, the signal input 15 is assumed to consist of samples taken in rapid succession from the different channels of a vocoder system of the type disclosed in Homer Dudley Patent 2,151,091 granted March 21, 1939, the frequency $f_0$ may be 2,000 cycles per second on the basis of a band of 0 to 250 cycles per second for the sampled output and a total swing of the modulated carrier amounting to 500 cycles per second (±250 cycles of the 2,000-cycle wave). In this case $f$ may equal 512,000 cycles per second the total frequency reduction factor is 56, and $f_1$ might be 128,000 cycles per second, these values being given for illustration only.

Referring again to Fig. 1, the frequency modulated output at terminals 30, 31 is sent through a band-pass filter 43 having a suitable pass band to accommodate the frequency modulated wave, which is amplified at 41 and impressed on outgoing line 42 for transmittal to a distant station by wire line or over any other suitable type transmission channel.

It may be noted in passing that an output terminal 33 is indicated in Fig. 1. Pulses appear at this terminal at a rate in proportion to the amplitude of the input signal. If these pulses are integrated as by means of a low-pass filter the input signal may be recovered.

Figure 3:
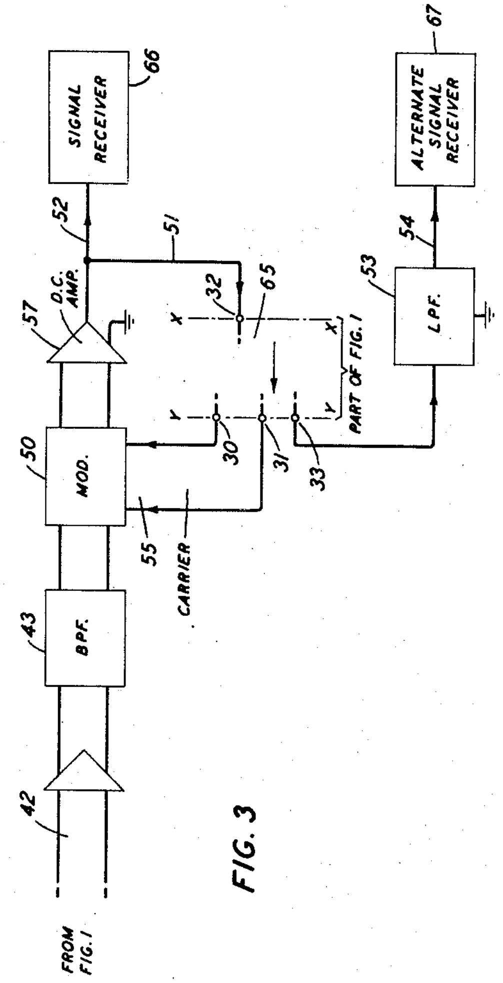
Fig. 3 is a simplified block schematic of a receiver for the type of transmitting circuit shown in Fig. 1.

A receiving circuit for receiving the signal transmitted from the circuit of Fig. 1 is shown in Fig. 3. The line 42 leading from the transmission medium between the stations is shown as feeding the received waves through an amplifier and through a band-pass filter 43 which may be a duplicate of filter 43 of Fig. 1 and thence into the input terminals of a modulator 50. This modulator may be of the well-known balanced or push-pull type having two high frequency inputs that are conjugate to each other and in this case a demodulated or low frequency output. One of the two high frequency inputs mentioned is that already described from the output of filter 43 and the other is from a carrier obtained in a manner to be described and supplied to the modulator 50 through branch circuit 55.

The portion 65 of the circuit of Fig. 3 between the broken lines XX and YY is assumed to be the same as that part of the circuit of Fig. 1 between the lines XX and YY but it will be noted that in Fig. 3 the direction in which the circuit is connected is the reverse of that shown in Fig. 1 so that the transmission in Fig. 3 through this part of the circuit is from right to left. The demodulator 50 operates as a zero beat demodulator. In the absence of a signal the carrier wave in circuit 55 has the same frequency and phase as the incoming unmodulated carrier wave, resulting in zero output. Frequency modulations of the incoming carrier wave tend to produce a low frequency output which is amplified at 57 and fed back through conductor 51 to terminal 32 of the circuit 65 where they produce a frequency modulated carrier wave to be supplied through circuit 55 to the modulator 50. These modulations are in such direction as to tend to restore the zero beat condition and reduce the demodulated output to zero. Actually the resultant demodulated output has an intermediate value which at all times is a direct measure of the transmitted frequency. This demodulated output is fed through circuit 52 to the signal receiver 66.

As explained in connection with Fig. 1, direct current pulses appear at terminal 33 which, if integrated, restore the input signal. An alternative signal receiver 67 is shown in Fig. 3 for recovering the signal in this manner. It will be noted that terminal 33 is connected to the input side of low-pass filter 53 which in this case operates as an integrating circuit and converts the pulses on terminal 33 into a signal wave of the type that was put into signal transmitter 15 of Fig. 1. These pass into lead 54 and into alternate signal receiver 67.

The frequency modulation pulses appearing at terminal 33 of Fig. 1 are rich in harmonics and, for the type of input signal mentioned in the illustrated example above, the frequency modulation may extend down close to zero. If attempt were made to transmit these frequency modulation pulses by modulating them on a very stable high frequency carrier by ordinary methods it would be difficult or impossible to eliminate these harmonics by filtering and it would be difficult or impossible to discriminate sufficiently against the unwanted sideband in the modulator filters. These difficulties are avoided by the circuit of Fig. 1 which provides a means for impressing this type of modulation upon a very stable carrier with a high degree of precision and stability.

Figure 4:
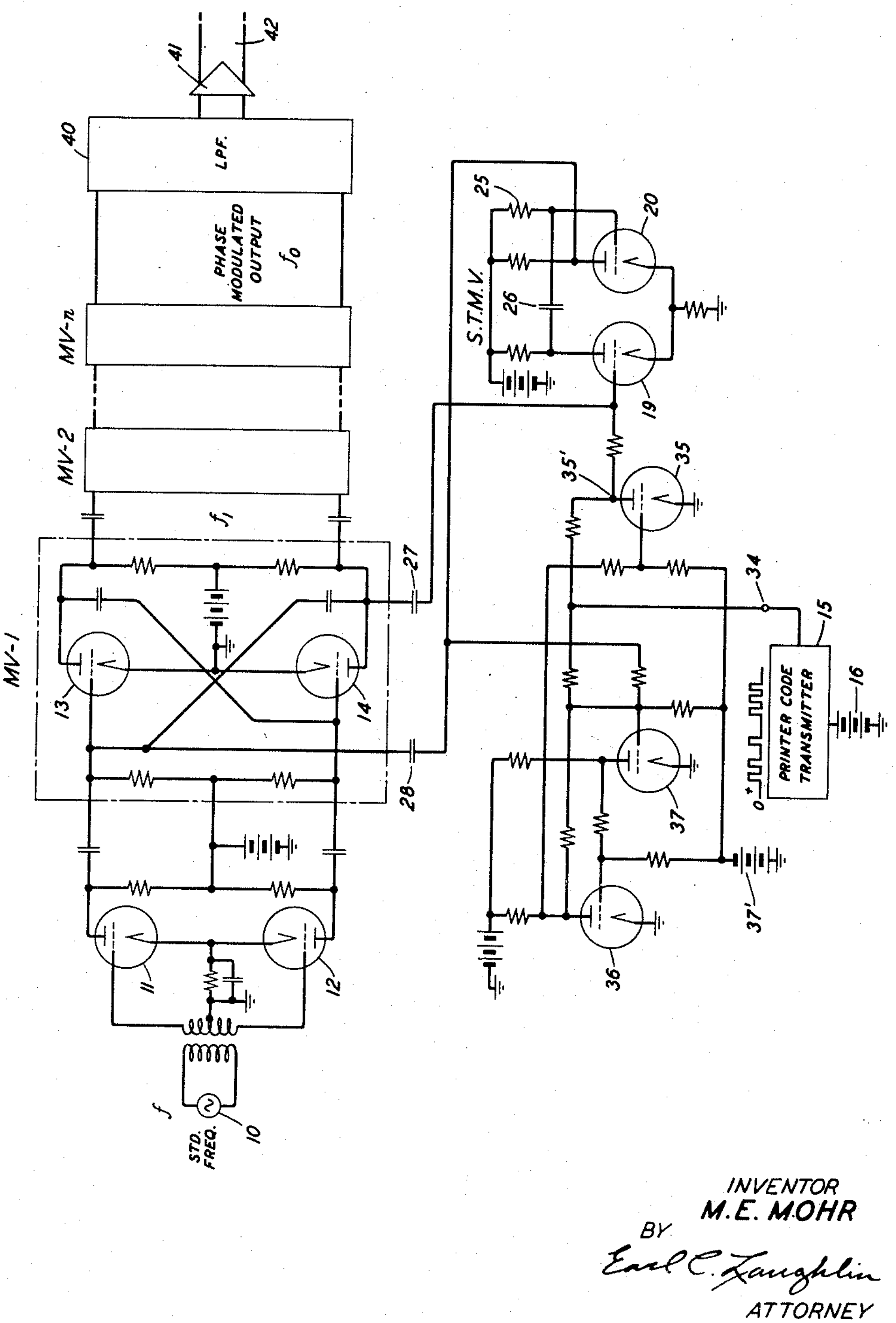
Fig. 4 is a schematic circuit diagram of another form of the invention using phase modulation or control.

Fig. 4 illustrates a type of phase modulating circuit which is suitable for transmitting coded signals such, for example, as telephone dial signals, printing telegraph code and similar types. In this circuit it is desired to have a definite fixed amount of phase shift introduced into the transmitted carrier each time a pulse is to be transmitted. This is accomplished in this circuit by sending a phase advancing pulse into the multi-vibrator MV—1 each time a pulse is impressed on input terminal 34 from signal input 15, assumed in this case to be a printer code transmitter.

The upper part of this figure has the same circuit configuration as the upper part of Fig. 1. The premature reversals, as in Fig. 1, are caused by the operation of single trip multivibrator 19—20.

The lower part of Fig. 4 shows means for causing one phase advancement of the carrier for each input signal pulse. (This system is one instance of a signal for which granularity in the modulation is desirable.) The single trip multivibrator 19—20 is the same as that of Fig. 1 and in its normal or stable condition tube 19 is cut off and tube 20 is conducting saturation current. The grid of tube 19 receives a positive pulse through condenser 27 from the plate of tube 14 of the multivibrator MV—1 each time tube 14 is cut off in the normal operation of the multivibrator. If at this time a signal pulse is present on terminal 34 and if also at this time tube 35 is non-conducting the grid of tube 19 is driven sufficiently positive to trip the multivibrator 19—20. As a result a positive pulse is fed from the plate of tube 20 through condenser 28 to the grid of tube 13 of the multivibrator but since this tube is already conducting this positive pulse has no effect. The two tubes 36 and 37 constitute a flip-flop circuit with tube 36 normally transmitting saturation current and tube 37 non-conducting. The positive pulse received from tube 20 when that tube cuts off as just described is applied to the grid of tube 37 causing this tube to conduct and cut off tube 36. In order for the flip-flop circuit to operate in this manner, however, it is necessary also that the signal pulse shall also be present at the same time on the grid of tube 37. When tube 36 is cut off in the manner just described a positive voltage is supplied to the grid of tube 35 rendering that tube of low impedance and shunting off the signal to ground at the point 35′. This is to prevent the tube 19 from being made conductive a second time by the same signal pulse. The signal trip multivibrator 19—20 restores to its normal or stable condition with tube 20 saturated and tube 19 cut off after the lapse of a predetermined short interval as determined by the time constants of the timing circuit 25, 26.

Reviewing the condition of the circuit at this time, the original signal pulse is assumed to be still present on the grid of tube 37 holding that tube conducting and tube 36 cut off. The effect of this signal pulse on the grid of tube 19, which is now also cut off due to the restoration of the circuit 19—20 to its stable condition, is nullified by the fact that tube 36 is supplying positive voltage to the grid of tube 35 which latter short-circuits the signal voltage to ground at point 35′. It will be impossible to make tube 19 again conduct so long as this signal pulse persists even though pulses may in the meantime be received from the plate of tube 14 of the multivibrator over condenser 27.

When the single trip multivibrator circuit 19—20 restored to normal and tube 20 became saturated, a negative pulse was transmitted through condenser 28 to the grid 13 of the multivibrator circuit MV—1. The timing circuit of the single trip multivibrator 19—20 is so proportioned as to make this negative pulse arrive on the grid of tube 13 at an appropriate point in the multivibrator cycle. This pulse as stated causes tube 13 to cut off and reverse the multivibrator circuit at a definite time in advance of the time when the circuit would reverse under control of the next driving pulse of proper sign. In this way a definite advancement is made in the phase of the wave $f_1$ and therefore a proportionately smaller phase advance is made in the final output wave $f_0$.

At the end of the signal pulse on terminal 34 under consideration the positive signal voltage is removed from the grid of tube 37, which is now cut off by voltage from battery 37′, causing tube 36 to saturate and cut off shunting tube 35. The circuit has now been returned to normal and in readiness to receive the next signal pulse.

Figure 5:
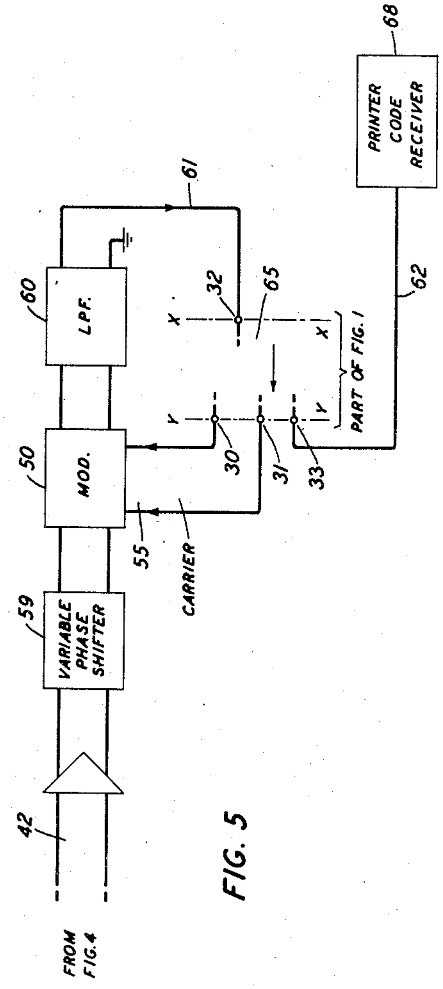
Fig. 5 is a similar schematic of a receiver for the type of transmitting circuit shown in Fig. 4.

Fig. 5 shows a type of receiving ciircuit to be used in connection with the transmitter circuit of Figure 4. The receiver is based on the circuit of Fig. 1 in combination with a feedback modulator. When the system is quiescent the carrier frequency fed to the modulator through circuit branch 55 is 90 degrees out of phase with the incoming wave. This condition may be secured by adjustment of the variable phase shifter 59 in the input of the modulator 50. This phase shifter can be either manual or automatic. Under this condition the direct current voltage out of the modulator is zero. Now when the phase is advanced at the transmitting end as a result of one of the signal pulses in the printer code transmitter 15, the resulting phase shift appearing at the modulator input in turn results in a direct current voltage appearing at the modulator output or at the input to the low-pass filter 60. This voltage in turn operates on the input terminal 32 and causes the phase of the carrier to advance bringing the direct current modulator output to zero again. In accomplishing the phase advance on the receiving end, a pulse appears on terminal 33 of the phase modulator circuit 65. Thus one pulse appears on terminal 33 for each pulse introduced at the transmitting end. These pulses are supplied over line 62 to the printer code receiver 68.

The invention is not to be construed or limited to the specific circuits or details disclosed or to quantitative values given, since these are for illustration.

What is claimed is:

1. A wavelength modulating circuit comprising a source of constant frequency waves, frequency dividing means driven thereby for producing therefrom waves of submultiple frequency, and means for introducing pulses into said frequency dividing means at a rate related to the instantaneous signal intensity, and means to time said pulses to occur slightly in advance of the driving wave maxima, said pulses when present taking control and producing advances in phase of the output submultiple frequency wave.

2. A signal modulating circuit comprising a source of constant frequency input pulses, a frequency reducing circuit receiving pulses from said source and producing but one output pulse for a succession of pulses from said source whereby said output pulses have a lower frequency than said input pulses, means to feed to said frequency reducing circuit extra pulses under control of the modulating signal at a rate dependent upon the instantaneous signal intensity, and means to time said extra pulses to occur a definite interval in advance of the time when said frequency reducing circuit would otherwise produce its output pulse in response to one of said input pulses, said frequency reducing circuit producing its output pulse instead at the time of occurrence of said extra pulse when such is present.

3. The circuit claimed in claim 2 including further frequency reducing means following said first-mentioned frequency reducing means and producing output pulses of lower frequency in response to the output pulses received from said first-mentioned frequency reducing circuit.

4. In a signaling system, a source of carrier waves, a frequency reducing multivibrator driven by said waves, a source of signal waves, a control circuit, means to render said control circuit receptive to a signal sample at a definite time in advance of the operating time of said multivibrator as determined by said carrier waves, and means comprising said control circuit for temporarily taking over control of said multivibrator and causing it to generate an output pulse at a predetermined interval ahead of such operating time.

5. A modulating system comprising an input source of high frequency pulses, a succession of multivibrators driven in tandem from said source, each multivibrator producing normal output pulses of lower frequency than the driving pulses applied to it, and means to produce modulation of the time of occurrence of the output pulses of the final multivibrator in accordance with a signal comprising means to introduce into an earlier multivibrator of the succession pulses occurring between the driving pulses for said earlier multivibrator to cause production by said earlier multivibrator of pulses occurring at earlier times than the times corresponding to the normal pulses of said earlier multivibrator, and means to make the rate of said introduced pulses vary as a direct function of the signal intensity.

6. A pulse time modulator comprising a high frequency wave source followed by a multivibrator for producing a divided freqency output pulse wave, a circuit under control of a modlating signal for producing modulating pulses in timed relation to the output pulses from said multivibrator and means controlled by said circuit for injecting said modulating pulses into said multivibrator circuit to advance the reversal time of said multivibrator by a definite amount per modulating pulse.

7. A circuit for advancing the phase of a given wave by increments in proportion to the number of impressed control pulses comprising a source of high frequency pulses, a multivibrator driven by said high frequency pulses and producing in its output the given wave by frequency division, a control circuit including means for determining the presence or absence of a control pulse, means to derive a timing pulse for said last-named means from said multivibrator by the reversal thereof, and means controlled by said first-named means in response to the presence of a control pulse for injecting into said multivibrator a reversing pulse at a definite time in advance of the time of occurrence of a driving pulse from said high frequency source.

8. A frequency dividing multivibrator, a source of constant frequency driving pulses for said multivibrator, a second driving circuit for supplying driving pulses to said multivibrator at times under control of a modulating current, and means to time the driving pulses from said second circuit in relation to the constant frequency pulses so as, when present, to occur at a definite time in advance of the regular reversal time as determined by said constant frequency pulses.

9. In a modulating system, a source of constant frequency pulses, a frequency dividing multivibrator normally reversed at regular times by said pulses, a source of modulating current, a pulse producing circuit jointly controlled by the output of said multivibrator and the modulating current to produce pulses slightly in advance of the reversing driving pulses and means to introduce said produced pulses into the multivibrator circuit to cause premature reversals thereof.

10. In a modulating circuit, a source of constant frequency pulses, a multivibrator reversed normally by every $n^{th}$ pulse from said source, counting from the last reversal, a source of modulating current, means to produce a pulse ahead of the $n^{th}$ pulse as a function of the modulating current, means to inject such produced pulse into said multivibrator to cause it to reverse prematurely and then to begin its next cycle at the $(2n-a)^{th}$ pulse from said source, counting from the last reversal produced by one of said constant frequency pulses, where $a$ is an integer numerically smaller than $n$.

11. In a modulating system, a source of constant frequency pulses, a source of modulating pulses, a frequency dividing multivibrator driven by said constant frequency pulses, means controlled by said modulating pulses to inject into said multivibrator an extra pulse each time a modulating pulse occurs, each such extra pulse causing premature reversal of said multivibrator and thereby advancing the phase of the output wave thereof by a definite incremental amount.

12. A system according to claim 11 including a timing circuit under control of said multivibrator for determining the time at which said extra pulse is injected into said multivibrator said timing circuit including means to cause the extra pulse in each case to be injected a definite and fixed time in advance of a reversing pulse from said constant frequency source.

13. A system according to claim 11 including in the modulating source a circuit for translating a varying amplitude modulating wave into a succession of modulating pulses of varying frequency of occurrence as a function of the amplitude of said modulating wave.

14. A circuit for impressing a frequency modulated wave upon a high frequency carrier comprising a frequency dividing multivibrator for producing said high frequency carrier wave by frequency division of a still higher frequency driving wave, and means to impress unidirectional reversing pulses on said multivibrator in time coincidence with successive cycles of said frequency modulated wave and at times a fixed amount in advance of the normal reversal times of said multivibrator under control of the driving wave.

15. The method of impressing a frequency modulated wave upon a high frequency carrier wave comprising producing said high frequency wave as the output wave of a frequency dividing multivibrator driven by a still higher frequency wave, and prematurely reversing said multivibrator by unidirectional pulses in time coincidence with successive cycles of said frequency modulated wave and at times a fixed interval in advance of the normal reversal times of said multivibrator by said driving wave.

16. In a receiver having a high frequency wave phase modulated by a pulsed signal which comprises a modulator, means to impress a received wave on said modulator, means to supply a demodulating wave to said modulator of the same frequency as said high frequency wave, an output from said modulator for demodulating currents, and means to make the phase of the high frequency demodulating wave such as to produce zero demodulating output when the received high frequency wave is unmodulated, means for deriving said high frequency demodulating current which comprise a source of high frequency waves, a frequency dividing multivibrator driven thereby, means to produce extra reversing pulses for said multivibrator from and as a function of the demodulated currents, and means to introduce such extra pulses into said multivibrator to cause premature reversals thereof and thereby advance the phase of the output wave thereof, wherein the said high frequency demodulating wave comprises said output wave.

17. In a receiving circuit for a high frequency wave phase modulated by a pulse signal including a demodulating circuit on which said waves are impressed, an input to said demodulating circuit for high frequency demodulating waves, a feedback circuit from the output to said input of said demodulating circuit, and means to adjust the phase of the high frequency demodulating waves applied to said demodulating circuit into quadrature relation to the phase of the received waves when such received waves are unmodulated, the combination wherein said feedback circuit comprises a modulating system according to claim 11 in which said source of modulating pulses is the output of said demodulating circuit and said high frequency demodulating waves comprise the output from said multivibrator.

18. Means for operating a frequency dividing multivibrator to produce phase modulation of its output wave which comprises a source of constant high frequency pulses, means for normally driving said multivibrator by said pulses, means for producing extra driving pulses for said multivibrator as a function of a modulating wave, means under control of said multivibrator to time the production of said extra driving pulses to cause them to occur a definite time in advance of said high frequency pulses, and means for injecting said extra driving pulses into said multivibrator circuit to advance the reversal times thereof.

MILTON E. MOHR.

REFERENCES CITED

The following references are of record in the file of this patent:

UNITED STATES PATENTS

| Number | Name | Date |
|---|---|---|
| 2,086,918 | Luck | July 13, 1937 |
| 2,272,070 | Reeves | Feb. 3, 1942 |
| 2,288,575 | Stablein | June 30, 1942 |
| 2,338,395 | Bartelink | Jan. 4, 1946 |
| 2,408,692 | Shore | Oct. 1, 1946 |
| 2,451,824 | Guanella et al. | Oct. 19, 1948 |